(12) United States Patent
Cheung et al.

(10) Patent No.: US 8,939,070 B2
(45) Date of Patent: Jan. 27, 2015

(54) JUICER

(75) Inventors: Shu Wan Cheung, Hong Kong (HK); William Shu Sang Cheung, Hong Kong (HK); To Yin Pang, Hong Kong (HK)

(73) Assignee: Electrical Investments Limited, Tortola (VG)

(*) Notice: Subject to any disclaimer, the term of this patent is extended or adjusted under 35 U.S.C. 154(b) by 1148 days.

(21) Appl. No.: 12/113,925

(22) Filed: May 1, 2008

(65) Prior Publication Data

US 2009/0272280 A1    Nov. 5, 2009

(51) Int. Cl.
  *A23N 1/00* (2006.01)
  *A23N 1/02* (2006.01)
  *A47J 19/02* (2006.01)

(52) U.S. Cl.
  CPC *A23N 1/02* (2013.01); *A47J 19/027* (2013.01)
  USPC .............................. 99/513; 99/511

(58) Field of Classification Search
  USPC .................... 99/511, 513, 495, 574; 366/205; 426/51, 478, 481, 489, 495
  See application file for complete search history.

(56) References Cited

U.S. PATENT DOCUMENTS

| | | | | |
|---|---|---|---|---|
| 2,306,884 A | * | 12/1942 | Jakovicz | 100/125 |
| 2,527,695 A | * | 10/1950 | Bennett | 99/511 |
| 4,345,517 A | | 8/1982 | Arao et al. | |
| 4,454,806 A | * | 6/1984 | Schultz | 99/609 |
| 4,700,621 A | | 10/1987 | Elger | |
| 5,193,448 A | | 3/1993 | Antonio | |
| 5,355,784 A | | 10/1994 | Franklin et al. | |
| 5,392,699 A | | 2/1995 | Tai | |
| 5,405,096 A | | 4/1995 | Seol | |
| 5,421,248 A | * | 6/1995 | Hsu | 99/512 |
| 5,495,795 A | | 3/1996 | Harrison et al. | |
| 5,613,430 A | | 3/1997 | Lee | |
| 5,662,032 A | | 9/1997 | Baratta | |
| 5,784,954 A | | 7/1998 | Kokot et al. | |
| 6,050,180 A | | 4/2000 | Moline | |
| 6,058,833 A | | 5/2000 | Ling et al. | |

(Continued)

FOREIGN PATENT DOCUMENTS

| | | |
|---|---|---|
| CA | 1026241 | 2/1978 |
| CA | 1113351 | 12/1981 |

(Continued)

*Primary Examiner* — Dana Ross
*Assistant Examiner* — Renee L Miller
(74) *Attorney, Agent, or Firm* — Intellectual Property Law Group LLP

(57) ABSTRACT

There is provided a juicer for extracting juice from fruits and vegetables comprising a lower base, an upper base, a top cover with a hollow cylindrical feeding tube, a grating-disk and mesh filter assembly, a pulp collector, and a pusher. The upper base is mounted on a lower base and receives the grating-disk and mesh filter assembly. The grating disk is a concave shape and tooth-like cutters are arranged into rows on an inclined surface of the grating disk. The top cover is fitted on the upper base and houses a hollow cylindrical feeding tube. Inside the feeding tube is an anti-rotation protrusion, located at the bottom of the feeding tube made an integral part of the feeding tube to prevent the food from spinning inside the tube. The pusher is inserted into the feeding tube and contains a opening that matches the anti-rotation protrusion and into which rests the anti-rotation protrusion. The bottom of the pusher is convex-shaped and matches the concave grating disk. The pusher forces the fruit or vegetable through the bore of the feeding tube onto the grating disk.

17 Claims, 9 Drawing Sheets

(56) References Cited

U.S. PATENT DOCUMENTS

| | | |
|---|---|---|
| 6,397,736 B1 | 6/2002 | Tseng et al. |
| 6,543,340 B1 | 4/2003 | Fouquet |
| 6,609,455 B2 | 8/2003 | Fouquet |
| 6,742,447 B1 | 6/2004 | Chen |
| 6,813,997 B1 | 11/2004 | Lin |
| 6,862,981 B1 | 3/2005 | Yen |
| 6,862,982 B1 | 3/2005 | Wang |
| 6,968,777 B2 | 11/2005 | Lin |
| 6,981,442 B1 | 1/2006 | Lin |
| 7,040,220 B1 | 5/2006 | Cohen et al. |
| 7,059,241 B2 | 6/2006 | Lin |
| 7,066,082 B2 | 6/2006 | O'Loughlin |
| 7,080,594 B2 | 7/2006 | Lin |
| 2003/0061944 A1 | 4/2003 | Fouquet |
| 2005/0035231 A1 | 2/2005 | O'Loughlin |
| 2006/0000369 A1 | 1/2006 | Hsu |
| 2006/0021520 A1 | 2/2006 | Hsu |
| 2006/0060091 A1 | 3/2006 | Chang |
| 2006/0065133 A1 | 3/2006 | Moline |
| 2006/0075907 A1 | 4/2006 | Hsu |
| 2007/0056450 A1 | 3/2007 | Hensel |
| 2007/0210193 A1 | 9/2007 | Larsen |

FOREIGN PATENT DOCUMENTS

| | | |
|---|---|---|
| CN | 201042371 Y * | 4/2008 |
| EP | 0980664 | 2/2000 |
| JP | 1153113 | 6/1989 |

* cited by examiner

JUICER

BACKGROUND OF THE INVENTION

1. Field of the Invention

The present invention relates to a juicer. In particular, the present invention relates to a new and improved structure for a juicer with a concave shaped grating disk and an anti-rotation protrusion inside the feeding tube. The juicer in the present inventions can process both fruits and vegetables, and represents a marked improvement from already existing juicers.

2. Related Art

A conventional juicer is disclosed in FIG. 8. A conventional juicer generally embodies a feeding tube a2 which is provided within a top cover a1. The inner wall of the feeding tube a2 has an engaging body a3 protruding radially inward near the bottom end. The engaging body a3 is usually equipped with a knife-edge, and may sometimes exist as a separate part, to be assembled, as required, to the feeding tube a2. A pusher a4, is a cylindrical body having a large head and a slot a5 on one side. The lower end of the slot a5 has a cone-shape opening to match and accept the engaging body a3, when the pusher a4 is fully inserted into the feeding tube a2. When the pusher a4 is extended into the feeding tube a2, the engaging body a3 is engaged at the slot a5 and the pusher a4 will not rotate inside the feeding tube a2. The engaging body a3 also prevents the fruits and vegetables from spinning inside the feeding tube a2. One disadvantage of the engaging body a3 is that the knife-edge on the engaging body can be sharp to touch and is also prone to breakage.

FIG. 9 shows another embodiment of a conventional juicer. This conventional juicer has a motor b1 mounted on the body and drives a flat grating disk b2 to process fruits or vegetables that are fed through the feeding tube b3. When vertical force is applied to the pusher, pressure is transmitted to the motor via the foodstuff and the grating disk. As the force increases, the motor may stall, thereby interrupting the juicing process.

Accordingly, there is a need for an efficient juicer that reduces noise and vibration coming from the juicer but at the same time thoroughly cuts food in the juicer, is safe to handle and obtains maximum juicing capability.

SUMMARY OF THE INVENTION

An object of the present invention is to provide a juicer having a large feeding tube for receiving fruits and vegetables, either whole or cut into a suitable size. Another object of the present invention is to provide a juicer having a hollow cylindrical feeding tube, containing an anti-rotation protrusion located at the bottom of the feeding tube. The anti-rotation protrusion only runs inside the feeding tube partially along the axial direction, thereby causing minimal obstruction to the passage of food through the feeding tube. The anti-rotation protrusion is an integral part of the feeding tube and prevents the fruits and vegetables from spinning inside the feeding tube. In the absence of the anti-rotation protrusion, the spinning foodstuff inside the feeding tube can cause excessive noise and vibration.

Another object of the present invention is to provide the feeding tube with a number of different types of anti-rotation protrusions. In embodiments of the present invention, there is a cone shaped protrusion and an arc shaped protrusion. Neither of these two anti-rotation protrusions has a knife-edge, and is therefore safer for the user to handle and is less prone to breakage.

It is also an object of the present invention to provide a concave shaped grating disk. This concave disk design allows increased number of teeth to be placed onto the grating disk, thus promoting improved grinding. The concave grating disk has tooth-like cutters arranged into rows on the inclined surface. In the center area of the concave grating disk, there is (a) a straight blade or (b) a set of tooth-like cutters or a combination of both. The purpose of the center blade and teeth set is to grind down the core of certain types of fruits and vegetables. The concave shape of the disk induces efficient grinding action, thus ensuring that the motor does not easily stall during grinding. Downward pushing of the food inside the feeding tube pushes the food towards the disk center, thereby promoting complete grinding by the center blade or teeth set. The improved grinding also discourages large lumps of food from being flung into the mesh filter, and thereby prevents violent vibration and shaking. With improved grinding, the juicer operates at a substantially lower rpm with more comfort, less noise, and less vibration during the juicing process.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
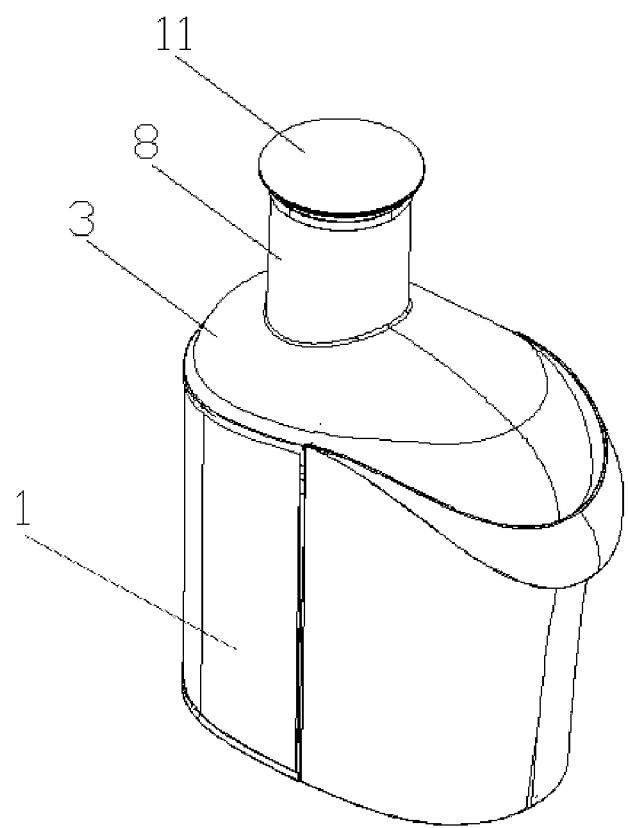
FIG. 1 is an assembled perspective view of a juicer according to an embodiment of the present invention.
Figure 2:
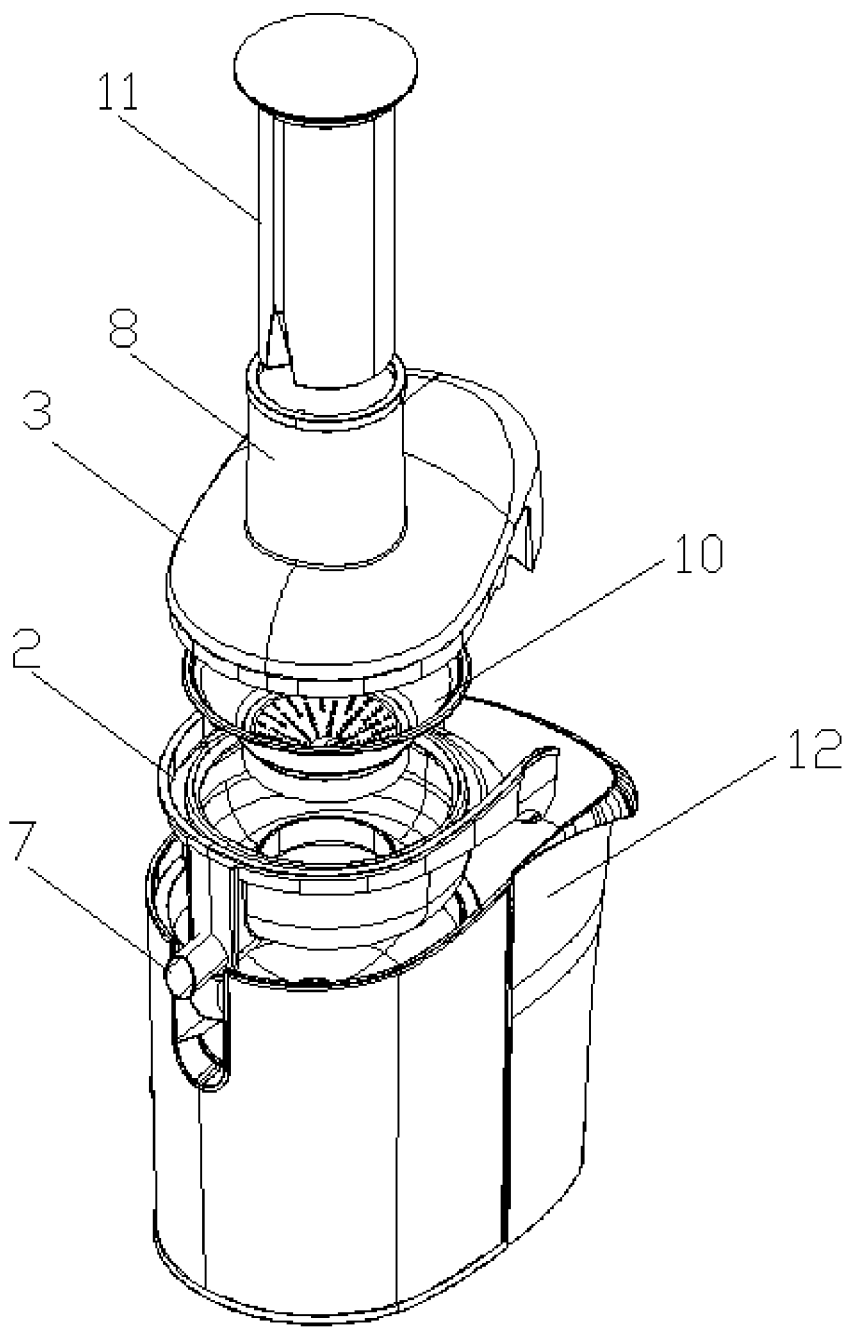
FIG. 2 is an exploded perspective view of FIG. 1.
Figure 3:
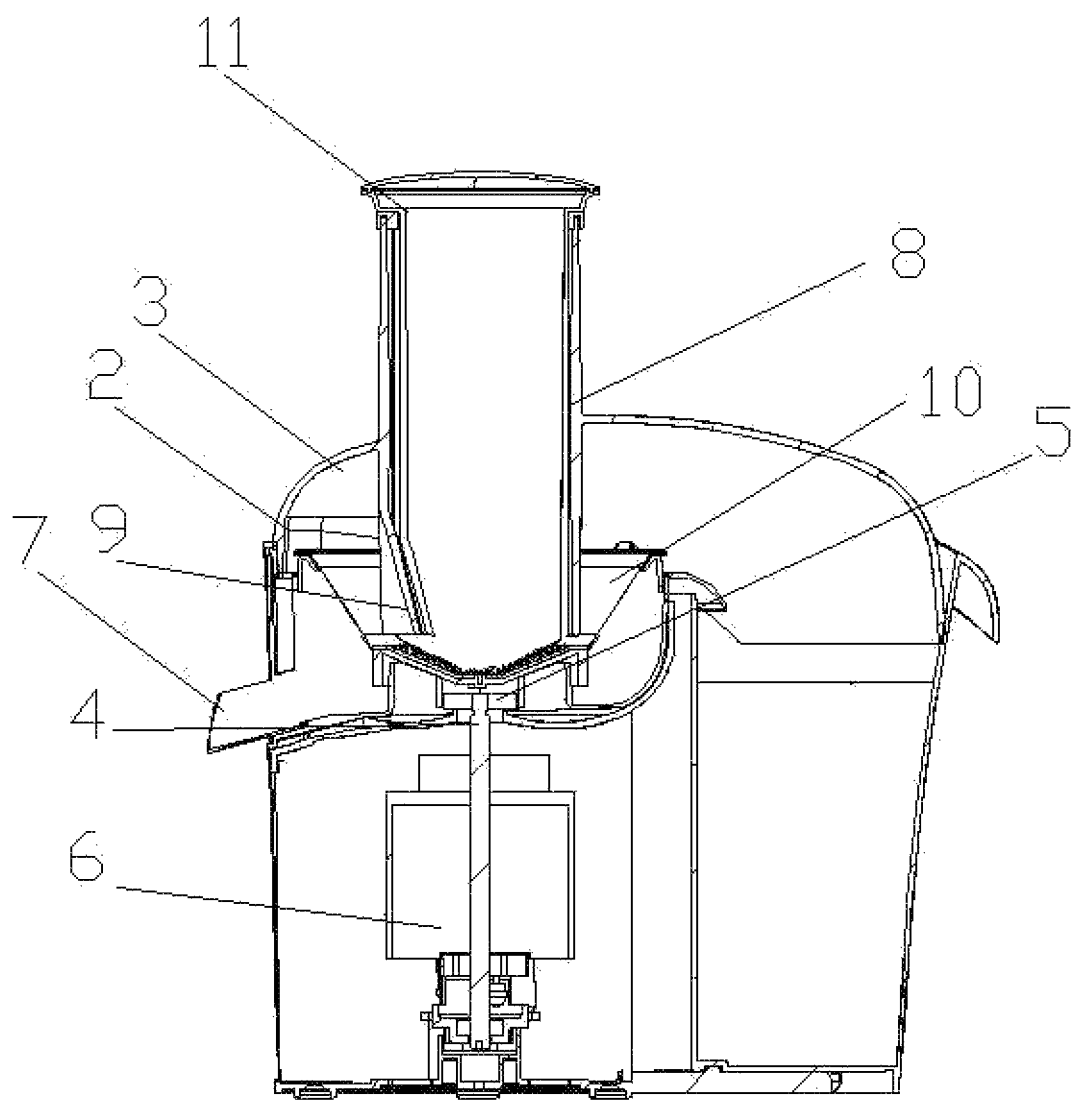
FIG. 3 is a cross-sectional view of FIG. 1.

FIG. 1, FIG. 2 and FIG. 3, depict the juicer according to an embodiment of the present invention, which comprises a lower base 1, an upper base 2, and a top cover 3. In the lower base 1, a motor shaft 4 is at a top center, a coupling 5 is screwed on top of the motor shaft 4, which is driven to rotate by a motor 6. Upper base 2 is mounted on the lower base 1, to receive a grating-disk and filter-mesh assembly 10, which is fitted onto the coupling 5. A nozzle 7 is provided at one lower side of the upper base 2 to release the juice. In the top cover 3, there is provided, a hollow cylindrical feeding tube 8, and an anti-rotation protrusion 9, located at the bottom of the feeding tube 8. The anti-rotation protrusion 9 is an integral part of the feeding tube 8 and configured into the manufacture of the feeding tube 8. The protrusion 9 is safe for use and does not comprise any sharp edge which can harm a user. The top cover 3 is fitted on the upper base 2 and the feeding tube 8 is positioned concentrically in relation to the grating-disk and mesh filter assembly 10. The pusher 11 is inserted into the feeding tube 8 and is used to force the fruit or vegetable deep into the feeding tube 8. A pulp collector 12 is attached to one lower side of the top cover 3, to collect pulp centrifugally thrown out of the juicer.

Figure 4:
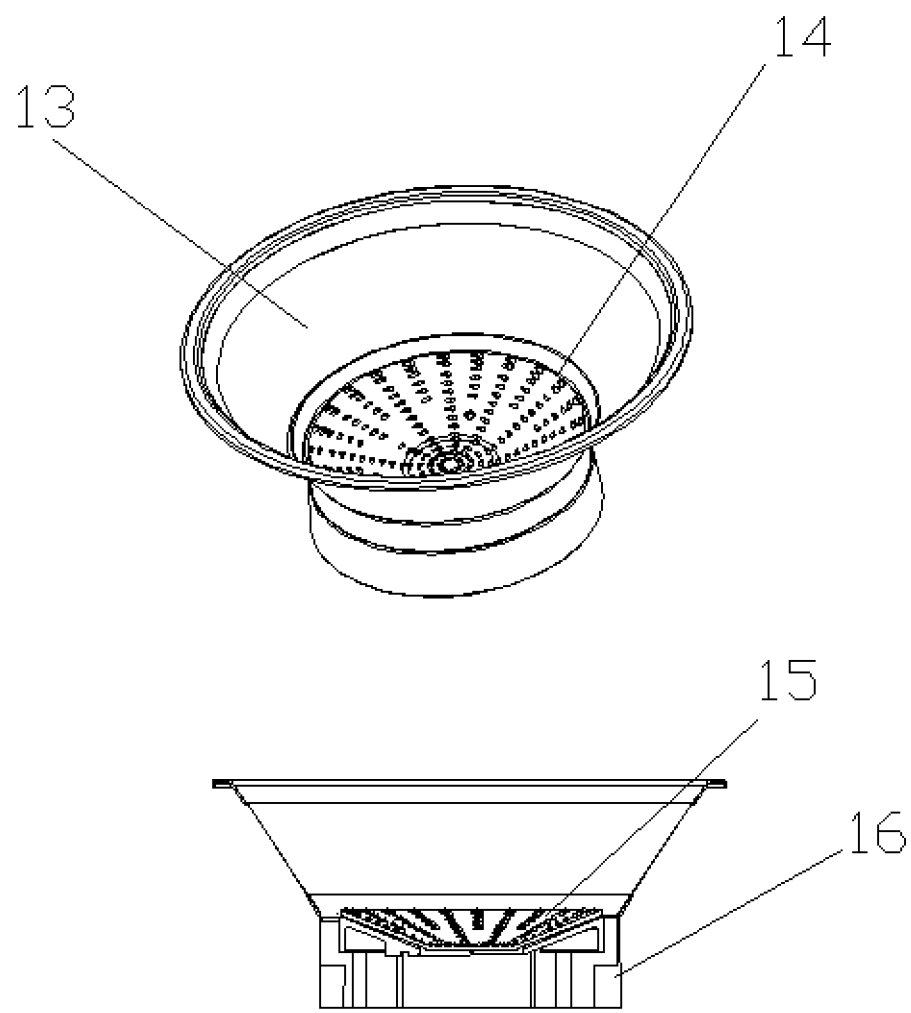
FIG. 4 shows a perspective view and a front sectional view of the grating disk of the juicer according to an embodiment of the present invention.
Figure 5:
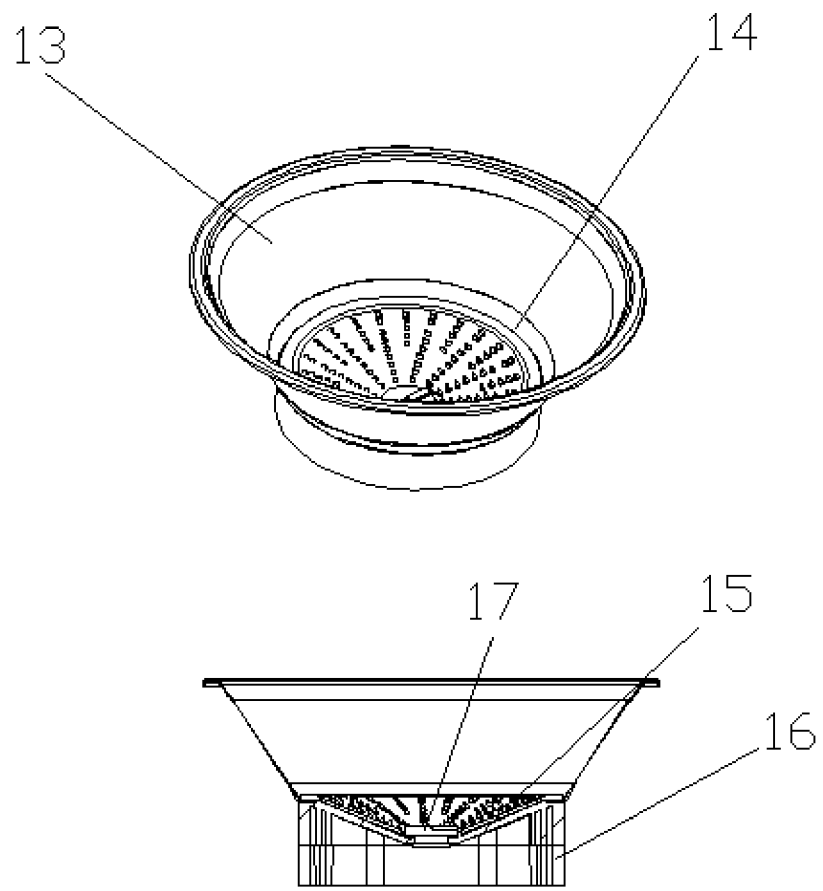
FIG. 5 shows a perspective view and a front sectional view of the grating disk of the juicer according to another embodiment of the present invention.

FIG. 4 and FIG. 5 depict the grating-disk and mesh filter assembly 10, containing the mesh filter 13 and a grating disk 14. The grating disk 14 is concave shaped, and tooth-like cutters 15 are arranged on the inclined surface of the grating disk 14. The grating disk 14 configured with a concave design allows increased number of teeth to be stamped onto the disk which facilitates more effective grating.

When the pusher 11 forces the fruit or vegetable through the bore of the feeding tube 8 onto the grating disk 14, the fruit or vegetable is ground by the grating disk 14, and the meshed fruit or vegetable is filtered by the mesh filter 13 to produce rich amounts of juice that flows out of the upper base 2 through the nozzle 7. The residual pulp from the meshed fruit or vegetable is centrifugally thrown out of the mesh filter 13 and is collected in the pulp collector 12. In an embodiment, the feed tube 8 may be located at an eccentric position on the grating disk 14 or at a concentric position on the grating disk 14.

FIG. 4 depicts the grating disk 14, which is concave shaped. The concave grating disk 14 can be of a different shape such as a "dish" shape while maintaining the concave profile. In other words, the concave grating disk 14 could be of a deeper or shallower dish shape in profile. The tooth-like cutter 15 is arranged into the row on the inclined surface and toward to the center area of a small flat circular surface. The lower part of the grating disk 14 is attached to a base 16, which is connected with the coupling 5 and is driven by the motor shaft 4.

FIG. 5 depicts another embodiment of the concave grating disk 14, where the tooth-like cutters 15, are arranged into the row on the inclined surface and the central area of the grating disk 14 has a small flat circular surface, to which is fixed a straight blade 17. The lower part of the grating disk 14 is attached to a base 16, which is connected to the coupling 5 and is driven by the motor shaft 4.

Figure 6:
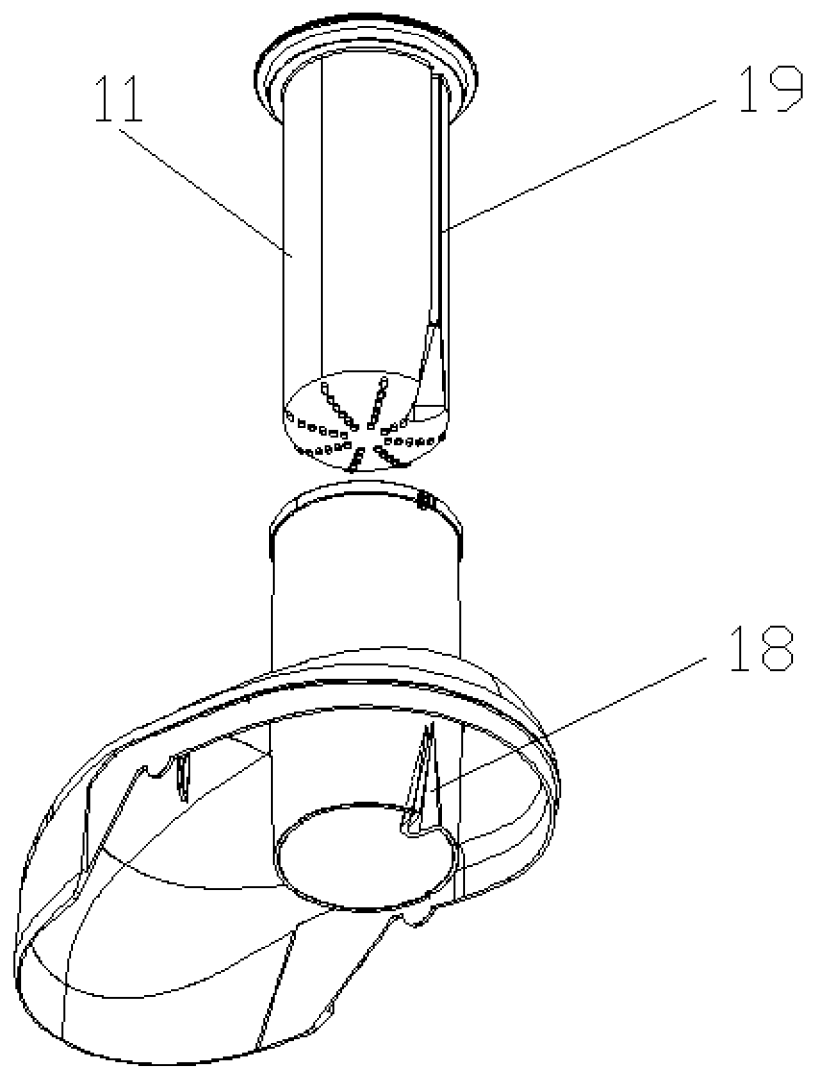
FIG. 6 is a perspective view showing the anti-rotation protrusion of the juicer according to an embodiment of the present invention.

FIG. 6 depicts an embodiment of the present invention to include an anti-rotation protrusion 18 that is a cone-shape protrusion and is an integral part of the feeding tube. A pusher 11 having a cylindrical body with a large end head and an opening 19 at one side, such that the lower end of the opening 19 has a cone-shape opening. The anti-rotation protrusion 18 matches and fits into the opening 19, when the pusher 11 is fully inserted into the feeding tube 8. In another embodiment, the bottom of the pusher 11 is convex-shaped and corresponds to the concave grating disk 14 when the pusher 11 forces the fruit or vegetable through the bore of feeding tube 8 onto the grating disk 14.

Figure 7:
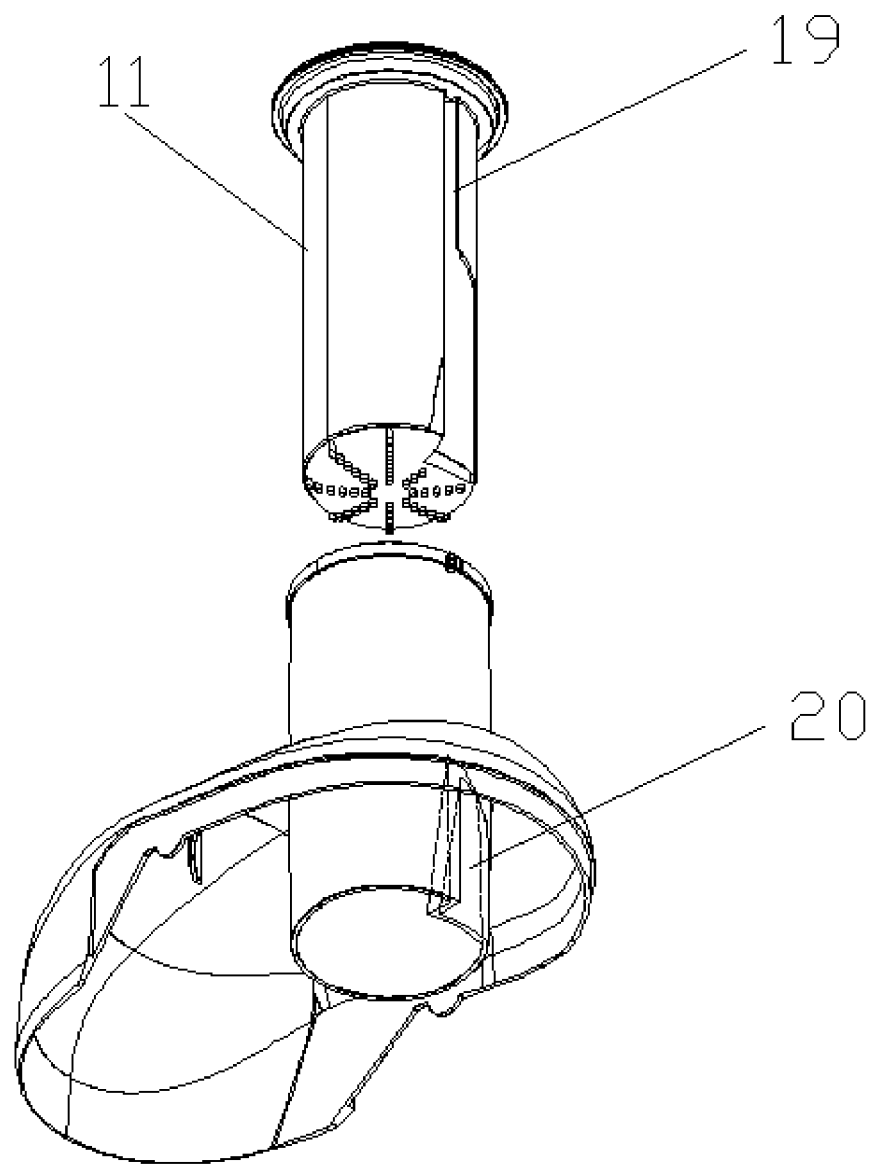
FIG. 7 is a perspective view showing the anti-rotation protrusion of the juicer according to another embodiment of the present invention.
Figure 8:
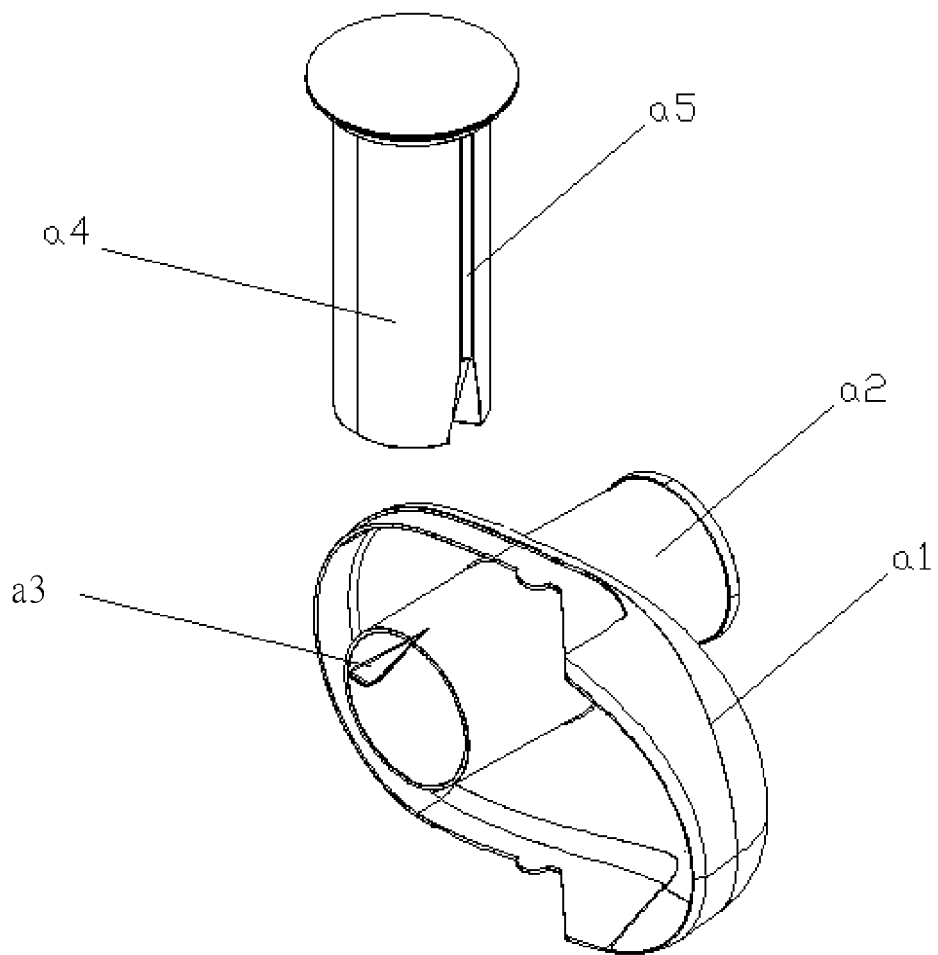
FIG. 8 shows the pusher and the top cover of a conventional juicer with a blade located at the bottom of the feeding tube according to the prior art.
Figure 9:
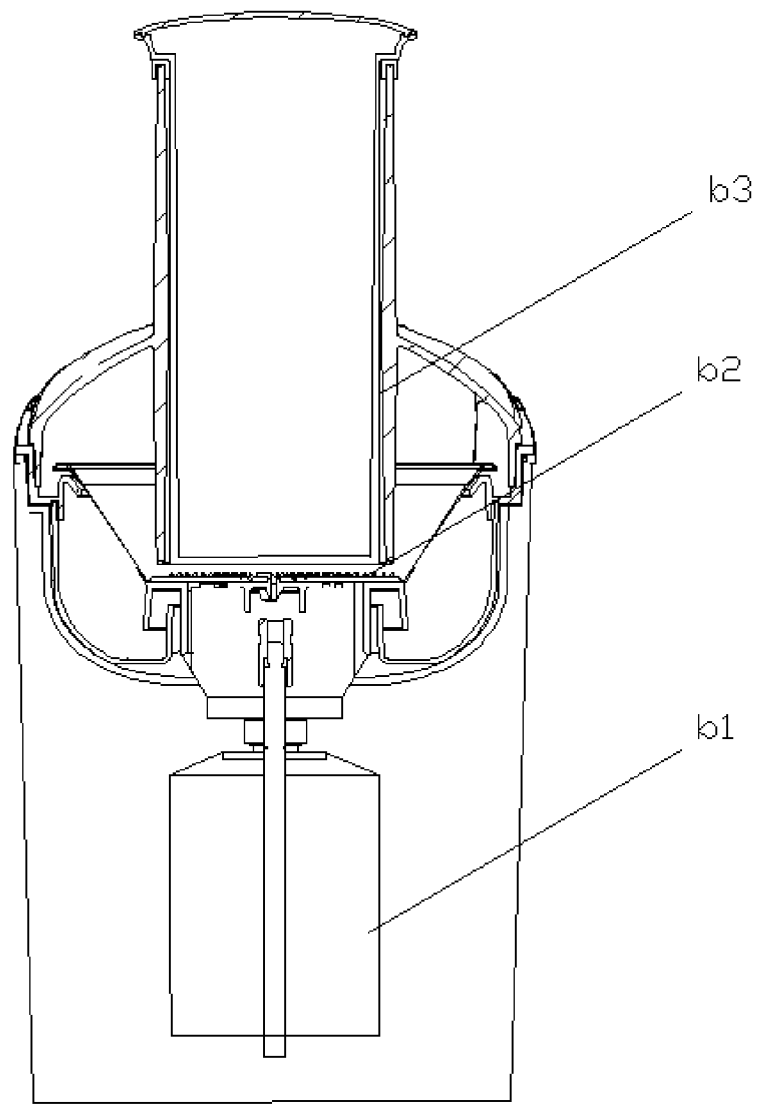
FIG. 9 shows a cross-section of a conventional juicer with a flat grating disk according to the prior art.

FIG. 7 depicts the anti-rotation protrusion 20 as an arc-shape protrusion according to an embodiment of the present invention. The protrusion is 20 is integrated as part of the feeding tube. A pusher 11 having a cylindrical body with a large end head and an opening 19 at one side, such that the lower end of the opening 19 has an arc-shape opening. The anti-rotation protrusion 20 matches and fits into the opening 19 when the pusher 11 is fully inserted into the feeding tube. In addition, according to an embodiment, the bottom surface of the pusher 11 comprises a textured surface or a surface having raised projections to further facilitate placing force against the food onto the grating disk. The juicer according to embodiments of the present invention, provides a very high juicing rate that prevents waste from fruits or vegetables.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

We claim:

1. An electrical juicer comprising:
    a lower base housing a motor, a motor shaft, and a coupling device screwed on a top of the motor shaft;
    an upper base mounted on the lower base providing a nozzle and housing a grating filter assembly fitted onto the coupling device, wherein the grating filter assembly comprises a base, a mesh filter, a concave grating disk having a concave profile, fitted to the base and including cutting teeth arranged onto a plurality of rows along an inclined surface of the grating disk, wherein the concave grating disk begins at a terminating end of the mesh filter and extends in depth to a level below the terminating end of the mesh filter; and wherein within each row along the inclined surface, beginning from a center of the concave grating disk, each cutting tooth sits at a higher elevation than a cutting tooth preceding it;
    a top cover fitted on the upper base and integrated with a hollow feeding tube and housing a pulp collector, wherein the feeding tube is configured with an integrated anti-rotation protrusion at a bottom of the feeding tube partially along the axial direction; and
    a pusher corresponding in shape to the feeding tube for insertion into the feeding tube, and a bottom of the pusher extendable past the terminating end of the mesh filter.

2. The electrical juicer of claim 1, wherein the cutting teeth are arranged facing towards a center of said grating disk, such that a point of each of the cutting teeth faces inward toward the center, and additional cutting teeth are provided on a parallel circular surface at the bottom of the grating disk.

3. The electrical juicer of claim 1, further comprising a straight blade fixed on a flat circular surface of a center of the grating disk.

4. The electrical juicer of claim 1, wherein the anti-rotation protrusion is a cone-shaped protrusion.

5. The electrical juicer of claim 1, wherein the anti-rotation protrusion is an arc-shaped protrusion.

6. The electrical juicer of claim 4, wherein the pusher comprises a cone-shaped opening to match and fit the shape of the anti-rotation protrusion when the pusher is fully inserted into the feeding tube.

7. The electrical juicer of claim 5, wherein the pusher comprises an arc-shaped opening to match and fit the shape of the anti-rotation protrusion when the pusher is fully inserted into the feeding tube.

8. The electrical juicer of claim 1, wherein the pusher comprises a large end head and a opening on a lower part of the length of the pusher to match and fit the shape of the anti-rotation protrusion when the pusher is fully inserted into the feeding tube.

9. The electrical juicer of claim 1, wherein, the pusher has a convex bottom corresponding to fit flush with the concave grating disk, when the pusher is inserted into the feeding tube.

10. An electrical juicer comprising:
a lower base, housing a motor, a motor shaft, and a coupling device screwed on a top of the motor shaft, the motor driving the motor shaft and the coupling device to rotate together;
an upper base mounted on the lower base providing a nozzle on a lower side of the upper base for juice to exit, and housing a grating filter assembly fitted onto the coupling device, wherein the grating filter assembly comprises
a base, a mesh filter, a concave grating disk having a concave profile, fitted to the base and including cutting teeth arranged onto a plurality of rows along an inclined surface of the grating disk and each of the cutting teeth having a point facing towards a center of said grating disk;
a top cover fitted on the upper base and integrated with a hollow feeding tube and housing a pulp collector on a lower side of the top cover, wherein the feeding tube is configured with an integrated anti-rotation protrusion at a bottom of the tube; and a pusher corresponding in shape to the feeding tube for insertion into the feeding tube, having a opening at one side to match the anti-rotation protrusion and a convex bottom surface to match the concave grating disk such that a widest outer diameter of the convex bottom of the pusher corresponds to fit flush against a widest inner diameter of the concave grating disk, and the convex bottom extendable below the mesh filter.

11. The electrical juicer of claim 10, further comprising additional cutting teeth on a parallel circular surface at the bottom of the grating disk.

12. The electrical juicer of claim 10, further comprising a straight blade fixed on a flat circular surface of a central area of the grating disk.

13. The electrical juicer of claim 10, wherein the anti-rotation protrusion is a cone-shaped protrusion.

14. The electrical juicer of claim 10, wherein the anti-rotation protrusion is an arc-shaped protrusion.

15. The electrical juicer of claim 13, wherein the pusher comprises a cone-shaped opening to match and fit the shape of the anti-rotation protrusion when the pusher is fully inserted into the feeding tube.

16. The electrical juicer of claim 14, wherein the pusher comprises an arc-shaped opening to match and fit the shape of the anti-rotation protrusion when the pusher is fully inserted into the feeding tube.

17. The electrical juicer of claim 10, wherein the convex bottom surface of the pusher comprises a set of projections to facilitate grating.

* * * * *